3,330,779
METHOD OF ACTIVATING A CATALYST AND CATALYST PER SE
Joseph P. Giannetti, Allison Park, Alfred M. Henke, Springdale, and Raynor T. Sebulsky, Verona, Pa., assignors to Gulf Research & Development Company, Pittsburgh, Pa., a corporation of Delaware
No Drawing. Filed June 11, 1965, Ser. No. 463,366
13 Claims. (Cl. 252—441)

Our invention relates to the preparation of a novel low temperature isomerization catalyst composition and to the use thereof for isomerization of relatively unbranched hydrocarbons to more highly branched forms.

It has previously been suggested in the art that composite catalytic materials comprising alumina and metalliferous hydrogenating components can be activated by treatment with a chloride containing compound. We have found that the activity of such materials can be further enhanced by a two-step activation method to provide a composite catalyst having an activity essentially greater than that provided by activation in accordance with the previously suggested techniques.

In accordance with our invention, a composite catalyst comprising a major proportion of alumina and a minor proportion of a metalliferous hydrogenating component is activated for isomerization of hydrocarbons by a combination of treating steps involving, first, treating the composite catalyst with a sulfur chloride at nonreducing conditions at a temperature in the range from about 950° to about 1250° F., and second, then treating the composite catalyst with a sulfur chloride at nonreducing conditions at a temperature in the range from about 200° to about 850° F. We prefer to employ sulfur oxychlorides, such as thionyl chloride or sulfuryl chloride, as the sulfur chloride utilized in the steps of our activation treatment, but other materials effective to activate alumina catalysts in accordance with our invention include those having the generic formula $S_nO_aX_bY_c$, wherein S is sulfur, O is oxygen, X is chlorine, Y is a halogen other than chlorine, $n$ is 1 or 2, $a$ is 0, 1, 2, 3 or 5, $b$ is 2, 4 or 7, $c$ is 0 or 1 and the sum of $b$ and $c$ is 2 to 8. Examples of such other materials are sulfur monochloride and sulfur dichloride. Composite catalytic materials that have been activated in accordance with our invention are highly effective as low temperature isomerization catalysts.

The composite catalysts from which the activated catalyst of our invention are derived can comprise any form of porous alumina suitable for use as a catalyst agent or support. For example, excellent results are obtainable with aluminas prepared by calcining a beta alumina trihydrate such as bayerite or mixtures thereof with other alumina hydrates. Aluminas prepared by calcining other hydrated aluminas, such as amorphous alumina formed by hydrolysis of aluminum methoxide, or crystallized alumina hydrates, such as alpha alumina trihydrate or gibbsite, or materials containing the same, such as bauxite or nordstrandite, and alpha and beta alumina monohydrates, such as boehmite and diaspore, or various combinations of these can be used. There can also be used the aluminas described in the copending patent application Ser. No. 118,240, filed June 20, 1961, now U.S. Patent No. 3,188,174, of Kehl and Stewart and U.S. Patents Nos. 3,151,939 and 3,151,940 also of Kehl and Stewart. These aluminas are prepared by calcining an alumina hydrate containing from 1.2 to 2.6 mols of water of hydration. Excellent results are also obtainable when employing aluminas combined with a small quantity of a Friedel-Crafts metal. These aluminas include the type wherein the Friedel-Crafts metal is present in a form combined with the alumina in some chemical or quasichemical manner as well as those obtained by the mere physical addition of a Friedel-Crafts metal to the alumina such as might be produced by impregnation. The alumina bases useful in our invention can be, aside from the Friedel-Crafts metals mentioned immediately above, essentially pure alumina as is preferred or they can contain small amounts, up to about 45 percent, of other refractory oxides such as silica, beryllia, titania, zirconia or boria. Such aluminas are generally characterized by a high surface area, commonly ranging from about 200 to 500 m.²/g. or even more. Especially advantageous results are obtained when using aluminas having a surface area of above about 300 m.²/g., although aluminas of lower surface can be used.

The catalyst bases or precursors from which the activated catalysts of this invention are prepared can be composited with a small proportion of at least one metalliferous hydrogenating component such as Group VI or Group VIII metals. Examples of suitable materials are platinum, palladium, rhodium, iridium, nickel and tungsten. Especially good results are obtainable with platinum and palladium. In general, the hydrogenating component is present in an amount from about 0.01 to about 5.0 percent by weight based on the total catalyst, and preferably from about 0.1 to about 2.0 percent, particularly in the case of noble metal components. For example, excellent results are obtainable with 0.3 and 0.7 percent platinum or 1 percent palladium on alumina.

The hydrogenating component can be combined with the alumina in any convenient way. Thus, for example, the hydrogenating component can be deposited on a precalcined alumina support in the form of an aqueous solution of a water-soluble salt, after which the wetted base can be calcined. Examples of such solutions are those containing chloroplatinic acid or other halogen platinum acids or aqueous solutions of nickel and tungsten nitrate in the desired proportion in respect to one another. Alternatively, the hydrogenating component can be added to the alumina hydrate prior to precipitation with a substance such as hydrogen sulfide followed by calcining. Additionally, an aqueous metal sulfide sol, such as, for example, a platinum sulfide sol, can be used to impregnate an alumina hydrate or it can be admixed with an aluminum solution prior to drying and calcining.

Regardless of the method of compositing the starting catalyst base, the noble metal hydrogenating components are advantageously converted to a reduced form prior to the activation with sulfur chloride so as to minimize loss of the hydrogenating component by the formation of volatile complexes during the sulfur chloride treatment. In the case of base metals such as nickel and tungsten, the hydrogenating component can remain in the form of an oxide or sulfide prior to the activation treatment, although the base metals can also be reduced prior to the activation treatment.

It is also important that the hydrogenating component be composited with the alumina base before any sulfur chloride treatment inasmuch as subsequent deposition normally would result in a reduction of the chlorine content of the activated base.

The catalyst base can also contain halogen other than that incorporated by the two-step sulfur chloride treatment of our invention. For example, some halogen content may result from the use of an aluminum halide as a starting material in forming the alumina base or some halogen may remain in the catalyst owing to the use of a halogen-noble metal acid. The halogen content from such sources as these, however, does not appear to be equivalent for purposes of our invention to the halogen content resulting from our sulfur chloride treatment.

The first step sulfur chloride treatment of the composite catalyst is carried out under conditions effective to remove at least a portion of the water of hydration not previously removed during calcining and drying of the composite catalytic material and that will not adversely affect the catalytic activity of the catalyst by fusion. We have found that temperatures in the range from about 950° to about 1250° F. are effective. We prefer, however, to employ in the first step treatment of our process temperatures in the range from about 1000° to about 1100° F. and have found that particularly advantageous results are obtainable when employing a temperature of about 1050° F. The second step sulfur chloride treatment of our process is conducted at a temperature substantially lower than that employed in the first step and includes temperatures in the range from about 200° to about 850° F. We have found it particularly advantageous to employ temperatures in the range from about 350° to about 800° F. in this second step treatment of our invention. Both the first and second step sulfur chloride treatments of our invention are to be conducted under nonreducing conditions at the above-described temperatures.

The quantity of the sulfur chloride employed in both steps of our process can be in any proportion with respect to the composite catalytic material that is effective to increase the chlorine content of such material. We prefer, however, to employ the sulfur chloride in an amount in excess of that capable of combining with the composite catalyst material at the reduced conditions employed. Effective results are obtainable by employing the sulfur chloride in proportions of about 0.1 to 1.0:1 by weight with respect to the catalyst, but larger or smaller proportions can also be used with good results. The action of the sulfur chloride on the composite catalytic material takes place at atmospheric pressure under the elevated temperatures indicated but superatmospheric or subatmospheric pressures can also be used, if desired. The sulfur chloride treatments of our invention can be carried out for as little as a few minutes with some resultant improvement in catalytic activity, however, we prefer to continue the sulfur chloride treatments until no further evolution of water of hydration can be observed or until no further combination of sulfur chloride with the catalyst is obtained at the reaction conditions. Normally this point will have been reached before about 3 hours at the temperature ranges indicated and no further advantage is obtained by longer periods of sulfur chloride treatment. We prefer, however, to continue the sulfur chloride treatments of our process for a period from about 15 minutes to about 5 hours. Generally, we have found that it is advantageous to conduct the first step sulfur chloride treatment for a period of time substantially greater than that employed in the second step sulfur chloride treatment. Thus, in accordance with the preferred method of operation of our invention, the first step sulfur chloride treatment is conducted for a period of time in the range from about ½ hour to about 4 hours while the second step sulfur chloride treatment of our invention is conducted for a period of time in the range from about 15 minutes to about 1 hour.

We have found that the activated catalysts prepared in accordance with our invention are particularly suitable for the isomerization of relatively unbranched hydrocarbons to more highly branched forms. Feed stocks which are suitable for employment in the isomerization process of our invention include any hydrocarbon fraction or stock which is substantially free of olefinic type components and which contains a substantial proportion of relatively unbranched saturated components, such as paraffins or naphthenes. It is essential that the feed stock employed in our invention does not contain any appreciable amount of olefins since they appear to destroy the effectiveness of our process to isomerize saturated compounds. Our process is effective to isomerize not only completely unbranched saturates, such as normal paraffins, to branched materials, such as isoparaffins, but is also effective to isomerize relatively unbranched hydrocarbons, such as methylpentanes, to more highly branched forms, such as dimethylbutanes. Illustrative of sources of such stocks available from refinery processes are the paraffin-rich streams obtained from the raffinate phase of Udex or Sulfolane processes. In the event that such refinery streams contain a significant quantity of olefinic type components, it may be necessary to subject them to hydrogenation in order to saturate the olefinic material prior to charging the stocks to our process.

When practicing the isomerization process of our invention, we have found that suitable reaction conditions include a temperature within the range from about 75° to about 500° F. and preferably from about 150° to about 400° F., while employing a pressure from about 0 to about 3000 p.s.i.g. and preferably from about 0 to about 1000 p.s.i.g. Generally, a liquid hourly space velocity from about 0.1 to about 10.0 and preferably from about 0.5 to about 4.0 volumes of feed stock per hour per volume of catalyst can be employed. We have also found that a hydrogen to feed stock mol ratio in the range from about 0.1 to about 10.0 and preferably from about 0.1 to about 4.0 can be employed in the process of our invention.

In order to illustrate our invention in greater detail, reference is made to the following examples.

EXAMPLE I

In this example, 132 grams of a commercially available, reduced, platinum-alumina catalyst generally designated as Sinclair-Baker RD 150 is activated in accordance with our invention. Employing nitrogen as a carrier gas flowing at the rate of about .45 s.c.f./hr. a 54 gram quantity of thionyl chloride was passed over the platinum-alumina catalyst during a period of 3 hours while maintaining the catalyst at a temperature of 1050° F. The temperature of the catalyst was then reduced to 560° F. and a second 54 gram quantity of thionyl chloride with nitrogen carrier gas was passed over the catalyst during the course of a ¾ hour period. After this second treatment with thionyl chloride, the temperature of the catalyst was maintained at 560° F. for a period of 2½ hours while the flow of nitrogen carrier gas was maintained. This was done to insure that no unreacted thionyl chloride remained in the system. The system was then allowed to return to ambient temperature and the catalyst was removed and analyzed. Analysis showed a chlorine content of about 6 percent by weight based on the total catalyst.

EXAMPLE II

In this example several different samples of the commercial platinum-alumina catalyst mentioned in Example I were subjected to treatment with thionyl chloride employing various techniques including the method of our invention. The first catalyst sample comprised 125 grams of platinum-alumina. This catalyst was treated with 54 grams of thionyl chloride with a nitrogen carrier at a temperature of 1050° F. for a period of 3 hours. The second sample comprised 125 grams of the platinum-alumina catalyst and was subjected to treatment with 54 grams of thionyl chloride with a nitrogen carrier at a temperature of 560° F. for a period of ¾ hour. The third sample, comprising 125 grams of the platinum-alumina, is subjected to treatment with 54 grams of thionyl chloride with a nitrogen carrier at a temperature of 560° F. for a period of 3 hours. The fourth sample was treated in accordance with our invention and comprised 125 grams of the platinum-alumina which was treated with 54 grams thionyl chloride with a nitrogen carrier at a temperature of 1050° F. for a period of 3 hours. The sample was then treated with 54 grams of thionyl chloride with a nitrogen carrier at a temperature of 560° F. for a period of ¾ hour. The fifth sample comprised 125 grams of the platinum-alumina catalyst and was subjected to a combined hydrogen and hydrogen chloride treatment employing 45 grams of hydrogen chloride together with hydrogen flowing at a rate of 1.5 s.c.f./hr. at a temperature of 1050° F. for a period of 3 hours. The temperature of the catalyst was then reduced to a temperature of 560° F. at which time it was subjected to treatment with 54 grams of thionyl chloride with a nitrogen carrier for a period of ¾ hour.

The results of employing each of these five catalysts in the isomerization of n-butane to isobutane at a temperature of 350° F., a pressure of 800 p.s.i.g., a liquid hourly space velocity of 1.0 and a hydrogen to n-butane mol ratio of 2.5:1 are illustrated in Table I below wherein the chlorine content of each of the five catalysts together with the conversions obtained is shown.

TABLE I

| | Catalyst | Chlorine, percent by weight | Conversion percent by weight n-$C_4$ to iso-$C_4$ |
|---|---|---|---|
| 1 | $SOCl_2$ (1,050° F., 3 hours) +Pt-$Al_2O_3$ | 5.3 | 43 |
| 2 | $SOCl_2$ (560° F., ¾ hour)+Pt-$Al_2O_3$ | 8.7 | 41 |
| 3 | $SOCl_2$ (560° F., 3 hours)+Pt-$Al_2O_3$ | 8.5 | 41 |
| 4 | $SOCl_2$ (1,050° F., 3 hours)+$SOCl_2$ (560° F., ¾ hour)+Pt-$Al_2O_3$. | 5.9 | 51 |
| 5 | $H_2$+HCl (1,050° F., 3 hours)+$SOCl_2$ (560° F., ¾ hour)+Pt-$Al_2O_3$. | 3.9 | 51 |

From the above data it will be noticed that the manner of effecting a single step treatment of the platinum-alumina catalyst, whether conducted at a temperature of 1050° F. or 560° F. or whether conducted for a period of ¾ of an hour or 3 hours, appears to have substantially no effect upon the conversion obtained, as illustrated by the runs employing catalysts 1, 2 and 3. On the other hand, however, when employing a catalyst obtained by the two-step treatment of our invention, the catalyst obtained provides a conversion of 51 percent as illustrated by the run employing catalyst number 4. This represents an increase in conversion of some 18 to 20 percent over that obtained with catalysts 1, 2 and 3. Catalyst number 5, subjected to a hydrogen and hydrogen chloride pretreatment prior to thionyl chloride activation, provides a conversion the same as that obtained with the catalyst treated in accordance with our invention. It will be noticed, however, that the chlorine content of catalyst number 5 is substantially less than that of catalyst number 4 indicating that the anticipated life of catalyst number 5 would be substantially less than that of catalyst number 4 due to the lower chlorine content. In addition to this advantageous prolonged life obtainable with the catalyst of our invention, the treating process required by our invention has the additional advantage of requiring treatment by only one material, i.e., thionyl chloride, as opposed to treatment with two different reagents, i.e., $H_2$/HCl and thionyl chloride, thereby allowing the treatment to be conducted in the same apparatus.

We claim:

1. A method of activating a composite catalyst comprising a major proportion of alumina and a minor proportion of a metalliferous hydrogenating component selected from the group consisting of Group VI and Group VIII metals which comprises treating the catalyst in a first step with a sulfur chloride at nonreducing conditions at a temperature within the range from about 950° to about 1250° F. and then treating the catalyst in a second step with a sulfur chloride at nonreducing conditions at a temperature in the range from about 200° to about 850° F., the sulfur chloride having the generic formula $S_nO_aX_bY_c$, wherein S is sulfur, O is oxygen, X is chlorine, Y is a halogen other than chlorine, n is 1 or 2, a is 0, 1, 2, 3 or 5, b is 2, 4 or 7, c is 0 or 1 and the sum of b and c is 2 to 8.

2. The method of claim 1 wherein the temperature employed in the first step is from about 1000° to about 1100° F. and the temperature employed in the second step is from about 350° to about 800° F.

3. The method of claim 1 wherein the sulfur chloride employed in both the first and second steps is thionyl chloride.

4. The method of claim 1 wherein the metalliferous hydrogenating component is a noble metal.

5. The method of claim 4 wherein the sulfur chloride employed in both the first and second steps is thionyl chloride.

6. The method of claim 1 wherein the metalliferous hydrogenating component is platinum.

7. The method of claim 6 wherein the sulfur chloride employed in both the first and second steps is thionyl chloride.

8. An activated catalyst composite comprising a major proportion of alumina and minor proportions of chlorine and a metalliferous hydrogenating component selected from the group consisting of Group VI and Group VIII metals which activated catalyst is obtained by treating a composite comprising a major proportion of alumina and a minor proportion of a metalliferous hydrogenating component selected from the group consisting of Group VI and Group VIII metals in a first step with a sulfur chloride at nonreducing conditions at a temperature within the range from about 950° to about 1250° F. and then treating the composite in a second step with a sulfur chloride at nonreducing conditions at a temperature in the range from about 200° to about 850° F., the sulfur chloride having the generic formula $S_nO_aX_bY_c$, wherein S is sulfur, O is oxygen, X is chlorine, Y is a halogen other than chlorine, n is 1 or 2, a is 0, 1, 3 or 5, b is 2, 4 or 7, c is 0 or 1 and the sum of b and c is 2 to 8.

9. The catalyst of claim 8 wherein the metalliferous hydrogenating component is comprised of a Group VIII metal.

10. A method of activating a composite catalyst comprising a major proportion of alumina and a minor proportion of a metalliferous hydrogenating component selected from the group consisting of Group VI and Group VIII metals which comprises treating the catalyst in a first step with thionyl chloride at non-reducing conditions at a temperature in the range from about 950° to about 1250° F. and then treating the catalyst in a second step with thionyl chloride at non-reducing conditions at a temperature in the range from about 200° to about 850° F.

11. A method of activating a composite catalyst comprising a major proportion of alumina and a minor proportion of a metalliferous hydrogenating component selected from the group consisting of Group VIII metals which comprises treating the catalyst in a first step with thionyl chloride at non-reducing conditions at a temperature within the range from about 950° to about 1250° F. and then treating the catalyst in a second step with thionyl chloride at non-reducing conditions at a temperature in the range from about 200° to about 850° F.

12. A metod of activating a composite catalyst comprising a major proportion of alumina and a minor proportion of platinum which comprises treating the catalyst in a first step with thionyl chloride at non-reducing conditions at a temperature within the range from about 950° to about 1250° F. and then treating the catalyst in a second step with thionyl chloride at non-reducing conditions at a temperature in the range from about 200° to about 850° F.

13. A method of activating a composite catalyst comprising a major proportion of alumina and a minor proportion of a Group VIII noble metal which comprises treating the catalyst in a first step with thionyl chloride at non-reducing conditions at a temperature within the range from about 950° to about 1250° F. and then treating the catalyst in a second step with thionyl chloride at non-reducing conditions at a temperature in the range from about 200° to about 850° F.

References Cited

UNITED STATES PATENTS

| | | | |
|---|---|---|---|
| 2,606,878 | 8/1952 | Haensel | 252—442 |
| 2,785,138 | 3/1957 | Milliken | 252—415 |
| 3,116,259 | 12/1963 | Geerts et al. | 252—439 |
| 3,218,267 | 11/1965 | Gobel et al. | 260—683.68 |

OTHER REFERENCES

Moeller, Inorganic Chemistry, pp. 519–520, John Wiley and Sons, New York, 1952.

DELBERT E. GANTZ, *Primary Examiner.*

R. H. SHUBERT, *Assistant Examiner.*